(No Model.)
D. ASIRE.
Clothes Pounder.
No. 240,355. Patented April 19, 1881.
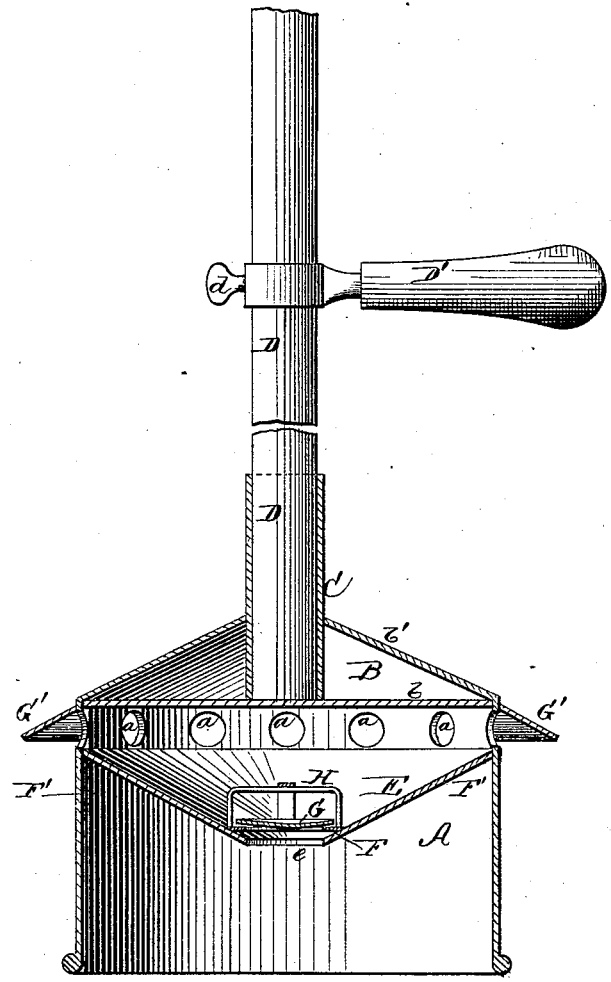
Witnesses:
N. C. McArthur
John C. Rogers
Inventor,
David Asire
per J. H. Alexander
Attorney.

United States Patent Office.

DAVID ASIRE, OF BEACH CITY, OHIO.

CLOTHES-POUNDER.

SPECIFICATION forming part of Letters Patent No. 240,355, dated April 19, 1881.

Application filed February 21, 1881. (No model.)

*To all whom it may concern:*

Be it known that I, DAVID ASIRE, of Beach City, in the county of Stark and State of Ohio, have invented certain new and useful Improvements in Clothes-Pounders; and I do hereby declare that the following is a full, clear, and exact description thereof, reference being had to the accompanying drawing, and to the letters of reference marked thereon, which forms part of this specification, in which the figure is a central vertical section of my invention.

This invention relates to an improvement in clothes-pounders; and it consists, first, in the combination, with the cylindrical casing in a clothes-pounder, of the funnel-shaped partition formed with an opening through the lowest extremity thereof, a flat ring secured to the funnel-shaped partition, above said opening, so as to constitute a valve-seat, a valve for opening and closing said opening, and a cage for guiding the valve, the outer cylindrical casing being closed at its top end and being formed with a line of perforations for the outflow of water; second, in the combination, with the casing in a clothes-pounder, of a funnel-shaped partition having an opening through its lowest extremity, a valve for closing said opening, a double-walled cover to the casing, a handle-socket secured in said cover, and an adjustable handle arranged upon a vertical handle-rod, the said casing of the pounder being provided with perforations to admit of the outflow of water.

The letter A refers to a cylindrical casing, which constitutes a portion of the body of the pounder. This cylindrical casing is open at its lower end, and at its upper end is closed by a top, B, which preferably consists of a horizontal plate, *b*, and an upper conical covering, *b'*, this construction admitting of a secure and durable connection being made between the pounder and the handle-socket C, which, as illustrated, is joined at its base to the horizontal plate *b*, and at a point above its base secured to the apex of the conical covering-shell *b'*. The handle-rod D, which is fitted into this socket, is provided with the short horizontal handle D', whereby the pounder can be conveniently operated. This handle is formed with an opening, through which the vertical handle-rod passes, and it will preferably be provided with a set-screw, *d*, in order that the handle may be adjusted upon the rod at a greater or less distance from the pounder, as may best suit the operator.

Within the cylindrical shell A is secured an inverted cone or funnel shaped shell, E, which is formed with an opening, *e*, through its lowest portion, and just above said opening is secured a flat ring, F, which constitutes a seat for the valve G. This valve consists of a metal plate arranged to act as a gravity-valve, and inclosing said valve, in order to maintain it in proper position, is a cage, H, composed of several strips or bars, which rise from the funnel-shaped shell and extend over the valve. This cage, while serving as an efficient guide for the valve, in nowise retards the flow of the water, which, when the pounder is depressed therein, passes up through the opening in the lower portion of the conical shell E.

In order to admit of the escape of water from the space within the cylindrical shell and above the cone-shaped shell, the shell A is provided with a line of perforations, *a*, near its upper end, through which perforations the water will flow out freely.

In using this device the clothes to be washed are placed in a tub of water and then subjected to the action of the pounder in the usual way.

It will be seen that by reason of the funnel-shaped shell, which forms a partition within the outer cylindrical casing, a space (designated in the drawing by the letter F') is left between the interior wall of the casing A and the outer or lower side of the funnel-shaped shell. I have found by this construction that during operation the air in said space F' will be compressed and form an elastic cushion, which will insure the flow of water up into the funnel-shaped shell in a much more rapid manner than if the horizontal form of partition were substituted for the funnel-shaped one. The valve is raised by the upward pressure of the water during the descent of the pounder, and it is closed, by reason of its own gravity and by the weight of the water, when the pounder is lifted up.

The arrangement of the perforations in the outer shell or casing, A, is such that while the water which flows up into the space above the funnel-shaped shell passes freely out through said perforations, a sufficient quantity of water will be left within said space to close the valve, and thus secure the raising of the clothes from the tub in the usual manner.

G' represents a flange, which is applied to the casing A above the line of perforations. This flange extends continuously around the casing and inclines downwardly, so as to prevent the splashing up of the water which issues through the perforations.

Having thus described my invention, what I claim, and desire to secure by Letters Patent, is—

1. In a clothes-pounder, the combination, with the cylindrical casing A, of the funnel-shaped partition E, formed with an opening through its lower extremity, a flat ring, F, secured to the funnel-shaped partition above said opening, so as to constitute a valve-seat, a valve, G, for opening and closing such opening, and a cage, H, for guiding the valve, the said casing A being closed at its top end and being also formed with a line of perforations, a, all substantially as herein shown and described.

2. In a clothes-pounder, the combination, with the casing A, formed with a line of perforations, a, and provided with a funnel-shaped partition, E, having the opening through the lower extremity thereof, and provided with a valve, of the double-walled top B and the handle-socket C, all constructed and arranged substantially as described.

In testimony that I claim the foregoing as my own I affix my signature in presence of two witnesses.

DR. DAVID ASIRE.

Witnesses:
   N. EICPENLAUB,
   FREEMON TRUBEY.